Nov. 11, 1947.     E. E. FRANZ     2,430,606
ADJUSTMENT DEVICE
Filed Dec. 6, 1941
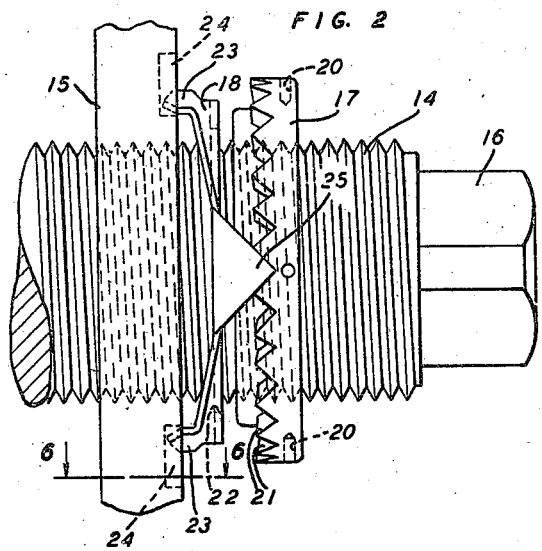
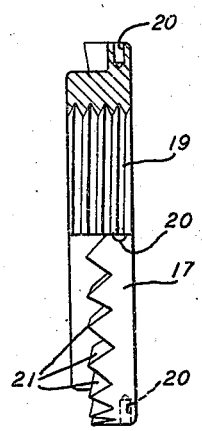
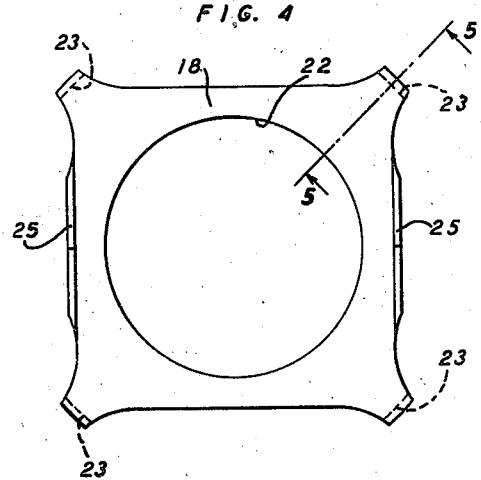
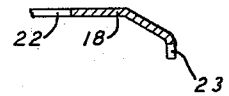
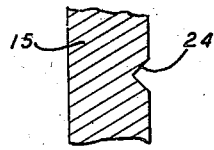
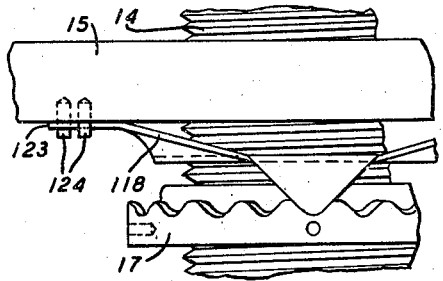
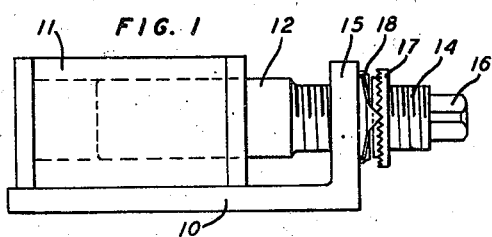
INVENTOR
E. E. FRANZ
BY
E. R. Nowlan
ATTORNEY Patented Nov. 11, 1947

2,430,606

UNITED STATES PATENT OFFICE 2,430,606

ADJUSTMENT DEVICE

Erwin E. Franz, Cranford, N. J., assignor to Western Electric Company, Incorporated, New York, N. Y., a corporation of New York Application December 6, 1941, Serial No. 421,870

13 Claims. (Cl. 151—14)

This invention relates to an adjustment device, and more particularly to a device for providing adjustable means to prevent accidental relative displacement of two members which are relatively rotationally adjustable.

Instances where two members are interfitted with screw threads to provide for adjustment of one with respect to the other, either as to relative position along the axis of their threaded portions, or as to relative angular position about that axis, are too innumerable to attempt to describe them. An illustrative instance is that in which a rod-like or cylindrical core of magnetic material is to be inserted more or less deeply into a helical coil of electrical conductor strand to modify adjustably an electrical characteristic of the coil, the core being provided with a threaded extension coacting with a correspondingly threaded bore in an adjacent stationary member.

An object of the present invention is to provide simple and reliable means to provide frictional resistance, of easily adjustable severity, to the relative rotation of two members connected together by interfitting screw threaded portions.

With the above and other objects in view, the invention may be embodied in a nut and washer to coact with each other and with interfitted screw-threaded parts, the nut being adapted to run on one of the said parts and being serrated on the face next to the other part, and the washer having spring teeth on one face thereof to enter the serrations of the nut and means on the other face to engage the said other part to be held thereby against rotation relative thereto.

Other objects and features of the invention will appear from the following detailed description of one embodiment thereof, taken in connection with the accompanying drawing in which the same reference numerals are applied to identical parts in the several figures and in which Fig. 1 is a diagrammatic view of the invention as embodied in a choke coil and shown in side elevation;

Fig. 2 is a broken view, much enlarged, of a portion of the showing of Fig. 1;

Fig. 3 is a detached edge view partially in section of the nut of Fig. 2;

Fig. 4 is a detached front view of the washer of Fig. 2;

Fig. 5 is a section on the line 5—5 of Fig. 4;

Fig. 6 is a section on the line 6—6 of Fig. 2; and

Fig. 7 is a broken view of a modified form.

In the embodiment of the invention herein shown, an electrical choke coil has a base 10 on which a hollow cylindrical coil 11 is stationarily mounted. A solid cylindrical core 12 is partially housed within the coil and is formed or provided with a coaxial, screw-threaded extension or tang 14 which passes through a corresponding threaded bore in a stationary support or member 15. The end of the threaded part 14 is formed with a square head 16 or otherwise provided with means whereby the tang 14 may be rotated in the support 15 and thereby cause the core proper 12 to be adjustably moved to extend more or less deeply within the coil.

It is then desirable to provide means which will ordinarily prevent any accidental rotation of the core and tang in the support and yet will not prevent intentional rotation when adjustment of the core in the coil is desired. For this purpose the nut 17 and washer 18 are provided.

The nut 17 has a threaded bore 19 dimensioned and threaded to fit the threaded tang 14. In the exterior periphery of the nut are one or more bores 20 adapted to receive the pin of an ordinary pin spanner wrench if necessary. The face of the nut intended to face the outer side of the support 15 is formed near its rim with a ring of serrations 21. These are here shown as angular teeth with angular interspaces but may have any form found to be desirable so only that they present alternate projections and recesses with contours capable of camming projections resiliently pressed against them.

The washer 18 is generally an annulus of appropriate resilient material, e. g. spring steel, having a central perforation 22 large enough to slide freely over the threads of the tang. On the face of the washer intended to stand next to the support 15, it is provided with means to engage the support and thereby prevent rotation of the washer relative to the support. As shown in Figs. 1 to 6 inclusive, these means are pointed teeth 23 projecting axially from the annulus 18 toward the support 15 and engaging in correspondingly formed recesses 24 in the support 15, and pointed teeth 25 projecting axially from the annulus 18 toward the nut 17 and engaging between the teeth 21 of the nut. As shown here there are four of the teeth 23 and two of the teeth 25 on the washer. There must be at least two of each kind of tooth, but there may be more of either or both. Preferably if there are only two of one kind they should be separated by teeth of the other kind, as shown, so that the resilience of the body of the annulus may be brought into full effect.

With the construction and arrangement described, the coil 11 and its core 12 are assumed to have been assembled on the base 10 and in the support 15, as shown in Fig. 1. The washer 18 is slipped over the tang 14 until its teeth 23 engage in the recesses 24, as best shown in Fig. 2. The nut 17 is then run up on the tang until its serrations 21 begin to be engaged by the teeth 25 of the washer. Because of the resilience of the washer and the manner in which each tooth 25 is at the crown of a spring bridge between two teeth 23, the serrations 21 will ride over the teeth 25, at first easily, but with increasing difficulty. By means of a spanner wrench engaging the bores 20 of the nut and a suitable socket or other wrench engaging the head 16 to turn the nut while holding the tang stationary, the washer may be brought under elastic stress of any degree desired, within reasonable limits, its annular body being elastically bowed in under the teeth 25 and between teeth 23 toward the support 15. When a suitable tension is attained, the spanner is discarded. If then, the head 16 is turned in either direction, the nut 17 is prevented from rotation by the teeth 25 and the serrations 21. The nut is held stationary with respect to the support 15 while the core 12 is traversed axially of the coil 11 as much or as little as desired, the screw 14 passing to and fro through the nut and support equally.

The washer 18 exerts a continuous unvarying elastic effort to drive the nut axially away from the support and thus causes friction of threads of the tank 14 on the threads of both the support and the nut. Thus a frictional resistance to the rotation of the tang is effected which serves to prevent accidental displacement of the tang. At the same time the continuous effort of the washer to urge the tang (and core) to the right in the support, as well as to urge the nut to the right on the tang, takes up any irregularity of pitch in the screw threads or other looseness or lost motion of the parts, so that the adjusted core stays put in its adjusted position, and micrometric adjustment of the tank 14 in the support 15 becomes possible.

The severity of the tension exerted by the washer is easily and simply adjustable from practically none at all to almost a positive lock of the tang in the support, by holding the head 16 with one wrench while turning the nut 17 with another. When so adjusted, the tension remains substantially constant when the tang is rotated, no matter how much or how little.

The nature of the elements 11 and 12 to be adjusted and held in adjustment by the device of the invention is evidently irrelevant to the invention. A choke coil was chosen to illustrate one mode of use of the invention merely because of its simplicity. The invention is applicable wherever one threaded member is to be adjustable in a correspondingly threaded member and it is desired (a) to impose frictional resistance to accidental displacement of the one member with respect to the other, (b) to adjustably vary this resistance, or (c) to take up play or lost motion between the two members.

The interlock of the washer 18 with the support 15 to permit rotation of the washer relative to the support is shown above as by means of pointed teeth 23 on the washer engaging correspondingly formed recesses 24 in the support. Other means might also be employed for this purpose, such as lugs 123 on the washer 118, engaging between pins 124 on the support, as shown in Fig. 7, where also are shown scalloped serrations 121 on the nut 117, engaging with rounded lobes on the washer 118. In view of this latter as well as the former arrangement, in the appended claims the word "serrations" is to be taken as including any sequence of alternating projections and recesses capable of camming the teeth 25 of the washer out of the recesses and over the projections, while the words "tooth" or "teeth" are to be taken as including any kind of salient angle, lug or projection capable of the effects described above.

Other variations and modifications will readily occur to fit special cases. The embodiments disclosed are illustrative and the invention is not limited to these which may be variously modified without departing from the scope and spirit of the invention as pointed out in and limited by the appended claims.

What is claimed is:

1. An adjustment device comprising a member having a threaded bore therein, and a member in the bore and having a corresponding external thread thereon, in combination with means to provide frictional resistance of adjustable severity to rotation of one of the said members with respect to the other, the said means comprising a nut threadedly engaged with and rotatable on the second named member and having serrations on the face thereof toward the first named member, a washer on the second named member between the nut and the first named member and having resiliently yielding teeth to engage the serrations, and the washer being provided with means to prevent relative rotary motion of the washer and the first named member, the serrations on the nut and the serration engaging teeth on the washer being so formed that these teeth may be cammed out of engagement with the serrations by relative rotation of the nut and washer with respect to each other in either direction.

2. An adjustment device comprising a member having a threaded bore therein, and a member in the bore and having a corresponding external thread thereon, in combination with means to provide frictional resistance of adjustable severity to rotation of one of the said members with respect to the other, the said means comprising a nut threadedly engaged with and rotatable on the second named member and having serrations on the face thereof toward the first named member, a resilient washer on the second named member between the nut and the first named member and having teeth to resiliently engage the serrations, and the washer being provided with means to prevent relative rotary motion of the washer and the first named member, the serrations on the nut and the serration engaging teeth on the washer being so formed that these teeth may be cammed out of engagement with the serrations by relative rotation of the nut and washer with respect to each other in either direction.

3. An adjustment device comprising a member having a threaded bore therein and engaging means thereon, and a member in the bore and having a corresponding external thread thereon, in combination with means to provide frictional resistance of adjustable severity to rotation of one of the said members with respect to the other, the said means comprising a nut threadedly engaged with and rotatable on the second named member and having serrations on the face thereof toward the first named member, a washer on the second named member between the nut and the first named member and having resiliently yielding teeth to engage the serrations, and the washer being formed with teeth to engage the engaging means on the first named member to hold the washer against rotation relative thereto, the serrations on the nut and the serration engaging teeth on the washer being so formed that these teeth may be cammed out of engagement with the serrations by relative rotation of the nut and washer with respect to each other in either direction.

4. An adjustment device comprising a member having a threaded bore therein and engaging means thereon, and a member in the bore and having a corresponding external thread thereon, in combination with means to provide frictional resistance of adjustable severity to rotation of one of the said members with respect to the other, the said means comprising a nut threadedly engaged with and rotatable on the second named member and having serrations on the face thereof toward the first named member, a resilient washer on the second named member between the nut and the first named member and having teeth to resiliently engage the serrations, and the washer being formed with teeth to resiliently engage the engaging means on the first named member to hold the washer against rotation relative thereto, the serrations on the nut and the serration engaging teeth on the washer being so formed that these teeth may be cammed out of engagement with the serrations by relative rotation of the nut and washer with respect to each other in either direction.

5. In an apparatus having a member with an internally threaded bore therein, and an exteriorly threaded member adjustably engaged in the bore, means to effect adjustably severe frictional resistance to rotation of the one member with respect to the other and comprising a nut threadedly engaged with and rotatable on the second named member and having serrations on the face thereof toward the first named member, a washer on the second named member between the nut and the first named member and having resiliently yielding teeth to engage the serrations, and the washer being provided with means to prevent relative rotary motion of the washer and the first named member, the serrations on the nut and the serration engaging teeth on the washer being so formed that these teeth may be cammed out of engagement with the serrations by relative rotation of the nut and washer with respect to each other in either direction.

6. In an apparatus having a member with an internally threaded bore therein, and an exteriorly threaded member adjustably engaged in the bore, means to effect adjustably severe frictional resistance to rotation of the one member with respect to the other and comprising a nut threadedly engaged with and rotatable on the second named member and having serrations on the face thereof toward the first named member, a resilient washer on the second named member between the nut and the first named member and having teeth to resiliently engage the serrations, and the washer being provided with means to prevent relative rotary motion of the washer and the first named member, the serrations on the nut and the serration engaging teeth on the washer being so formed that these teeth may be cammed out of engagement with the serrations by relative rotation of the nut and washer with respect to each other in either direction.

7. In an apparatus having a member with an internally threaded bore therein and engaging means thereon, and an exteriorly threaded member adjustably engaged in the bore, means to effect adjustably severe frictional resistance to rotation of the one member with respect to the other and comprising a nut threadedly engaged with and rotatable on the second named member and having serrations on the face thereof toward the first named member, a washer on the second named member between the nut and the first named member and having resiliently yielding teeth to engage the serrations, and the washer being formed with teeth to engage the engaging means on the first named member to hold the washer against rotation relative thereto, the serrations on the nut and the serration engaging teeth on the washer being so formed that these teeth may be cammed out of engagement with the serrations by relative rotation of the nut and washer with respect to each other in either direction.

8. In an apparatus having a member with an internally threaded bore therein and engaging means thereon, and an exteriorly threaded member adjustably engaged in the bore, means to effect adjustably severe frictional resistance to rotation of the one member with respect to the other and comprising a nut threadedly engaged with and rotatable on the second named member and having serrations on the face thereof toward the first named member, a resilient washer on the second named member between the nut and the first named member and having teeth to resiliently engage the serrations, and the washer being formed with teeth to resiliently engage the engaging means on the first named member to hold the washer against rotation relative thereto, the serrations on the nut and the serration engaging teeth on the washer being so formed that these teeth may be cammed out of engagement with the serrations by relative rotation of the nut and washer with respect to each other in either direction.

9. An adjustable friction and take-up device for screw stems in threaded bearings comprising, in combination with a screw stem having a one-way progressive thread and a threaded bearing in which said one-way thread of said stem is in adjustable threaded engagement, an abutment threaded upon said one-way thread of said stem and adjustable thereupon, yielding means engaging said abutment and said bearing and acting upon the adjustment of said abutment upon said one-way thread of said stem with respect to said bearing to exert a yielding axial thrust upon said stem in said bearing, and holding means acting to hold said abutment from turning with respect to said bearing, said holding means being releasable to permit adjustment of said abutment upon said one-way thread of said stem with respect to said bearing after assembly of said parts to change the yielding axial thrust exerted by said yielding means upon said stem in said bearing.

10. An adjustable friction and take-up device for screw stems in threaded bearings comprising, in combination with a screw stem having a one-way progressive thread and a threaded bearing in which said one-way thread of said stem is in adjustable threaded engagement, an abutment threaded upon said one-way thread of said stem and adjustable thereupon, spring means acting between said abutment and said bearing and adjustable by the adjustment of said abutment upon said one-way thread of said stem with respect to said bearing to exert a yielding axial thrust upon said stem in said bearing, and detent means acting to hold said abutment from being turned by turning adjustments of said stem, said detent means being releasable to permit adjustment of said abutment upon said one-way thread of said stem with respect to said bearing after assembly of said parts to change the yielding axial thrust exerted by said spring means upon said stem in said bearing.

11. An adjustable friction and take-up device for screw stems in threaded bearings comprising, in combination with a screw stem having a one-way progressive thread and a threaded bearing in which said one-way thread of said stem is in adjustable threaded engagement, an abutment threaded upon said one-way thread of said stem and adjustable thereupon, yielding means acting between said abutment and said bearing and adjustable by the adjustment of said abutment upon said one-way thread of said stem with respect to said bearing to exert a yielding axial thrust upon said stem in said bearing, and retaining means acting between said abutment and said bearing to retain said abutment in adjusted position with respect to said bearing, said retaining means being releasable to permit adjustment of said abutment upon said one-way thread of said stem with respect to said bearing after assembly of said parts to change the yielding axial thrust exerted by said yielding means upon said stem in said bearing.

12. An adjustable friction and take-up device for screw stems in threaded bearings comprising, in combination with a screw stem having a one-way progressive thread and a threaded bearing in which said one-way thread of said stem is in adjustable threaded engagement, an abutment threaded upon said one-way thread of said stem and adjustable thereupon, expansible spring means acting between said abutment and said bearing and compressible by the adjustment of said abutment upon said one-way thread of said stem with respect to said bearing to exert a yielding axial thrust upon said stem in said bearing, and detent means acting to hold said abutment from turning, to thereby retain the compression of said expansible spring means and the yielding axial thrust exerted thereby upon said stem during adjustments of said screw stem in said threaded bearing, said detent means being releasable to permit said abutment to be turned upon said one-way thread of said stem after assembly of said parts to change the compression of said expansible spring means and the yielding axial thrust exerted thereby upon said stem in said bearing.

13. An adjustable friction and take-up device for screw stems in threaded bearings comprising, in combination with a screw stem having a one-way progressive thread and a threaded bearing in which said one-way thread of said stem is in adjustable threaded engagement, an abutment threaded upon said one-way thread of said stem and adjustable thereupon, said abutment having a plurality of detent slots formed therein, yielding means acting between said abutment and said bearing and adjustable by the adjustment of said abutment upon said one-way thread of said stem with respect to said bearing to exert a yielding axial thrust upon said stem in said bearing, and detent means cooperating with the detent slots formed in said abutment to hold said abutment from turning from an adjusted position said detent means being releasable from and engageable with the different detent slots formed in said abutment to permit adjustment of said abutment upon said one-way thread of said stem with respect to said bearing after assembly of said parts to change the yielding axial thrust exerted by said yielding means upon said stem in said bearing.

ERWIN E. FRANZ.

REFERENCES CITED

The following references are of record in the file of this patent:

UNITED STATES PATENTS

| Number | Name | Date |
|---|---|---|
| 788,716 | Hammond | May 2, 1905 |
| 174,175 | Adgate | Feb. 29, 1876 |
| 355,646 | Gates | Jan. 4, 1887 |
| 2,258,652 | James | Oct. 14, 1941 |
| 2,251,560 | White | Aug. 5, 1941 |
| 420,294 | Coleman | Jan. 28, 1890 |
| 2,392,701 | Sanders | Jan. 8, 1946 |
| 1,239,958 | Pingel | Sept. 11, 1917 |

FOREIGN PATENTS

| Number | Country | Date |
|---|---|---|
| 33,446 | France | Sept. 28, 1928 |
| 101,985 | Great Britain | Nov. 9, 1916 |